United States Patent
Yaguchi

(10) Patent No.: US 7,958,134 B2
(45) Date of Patent: Jun. 7, 2011

(54) RECORDING DEVICE FOR WRITING CONTENT DATA WITHOUT CONTINUITY IN PRESENTATION TIMING

(75) Inventor: Yoshitaka Yaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 466 days.

(21) Appl. No.: 12/088,463

(22) PCT Filed: Sep. 28, 2006

(86) PCT No.: PCT/JP2006/319290
§ 371 (c)(1),
(2), (4) Date: Mar. 28, 2008

(87) PCT Pub. No.: WO2007/040135
PCT Pub. Date: Apr. 12, 2007

(65) Prior Publication Data
US 2010/0153406 A1   Jun. 17, 2010

(30) Foreign Application Priority Data

Sep. 30, 2005   (JP) .................................. 2005-288078

(51) Int. Cl.
G06F 7/00   (2006.01)
G06F 17/30   (2006.01)
(52) U.S. Cl. ....................................................... 707/756
(58) Field of Classification Search ........................ None
See application file for complete search history.

(56) References Cited

U.S. PATENT DOCUMENTS

| 5,903,734 A | * | 5/1999 | Chida | 709/232 |
| 6,598,224 B1 | * | 7/2003 | Maeda et al. | 717/174 |
| 2005/0254798 A1 | * | 11/2005 | Kato | 386/125 |
| 2006/0120224 A1 | * | 6/2006 | Nakamura et al. | 369/30.3 |
| 2009/0271429 A1 | * | 10/2009 | Sato et al. | 707/102 |

FOREIGN PATENT DOCUMENTS

| JP | 04-229462 | 8/1992 |
| JP | 2003-217266 | 7/2003 |
| JP | 2003-219325 | 7/2003 |
| JP | 2004-079006 | 3/2004 |
| JP | 2005-293749 | 10/2005 |

OTHER PUBLICATIONS

International Search Report for corresponding Application No. PCT/JP2006/319290 dated Oct. 31, 2006.

* cited by examiner

*Primary Examiner* — Uyen T. Le
(74) *Attorney, Agent, or Firm* — Renner, Otto, Boisselle & Sklar, LLP

(57) ABSTRACT

A recorder to write content data on a storage medium and includes: a determining section, which receives incoming content data and determines data properties thereof; a selecting section for selecting, depending on whether a predetermined condition is satisfied, either a first type of write processing to add the data to an existent file on the storage medium or a second type of write processing to write the data as a new file; and a writing section for writing the data on the storage medium by performing the selected type of write processing. The selecting section selects the first type of write processing if at least one part of the data properties of the data that have been determined by the determining section is identical with those of the data that is stored in the existent file on the storage medium but selects the second type of write processing unless this condition is satisfied.

15 Claims, 8 Drawing Sheets

FIG.5

| AV FILE # | FRAME FREQUENCY | IMAGE SCANNING METHOD | # OF HORIZON-TAL PIXELS | # OF VERTICAL PIXELS | MOVING PICTURE ENCODING METHOD | AUDIO ENCODING METHOD | FILE SIZE | FILE GENERATION DATE |
|---|---|---|---|---|---|---|---|---|
| AV FILE #1 | 30Hz | INTERLACED | 1920 | 1080 | MPEG4—AVC | Dolby AC-3 | 300MB | SEPT. 5, 2005 |

400

FIG.6
| FRAME FREQUENCY | IMAGE SCANNING METHOD | # OF HORIZONTAL PIXELS | # OF VERTICAL PIXELS | MOVING PICTURE ENCODING METHOD | AUDIO ENCODING METHOD |
|---|---|---|---|---|---|
| 30Hz | INTERLACED | 720 | 480 | MPEG4-AVC | Dolby AC-3 |
⟨EXAMPLE OF INCOMING AV DATA PROPERTIES⟩
FIG.7
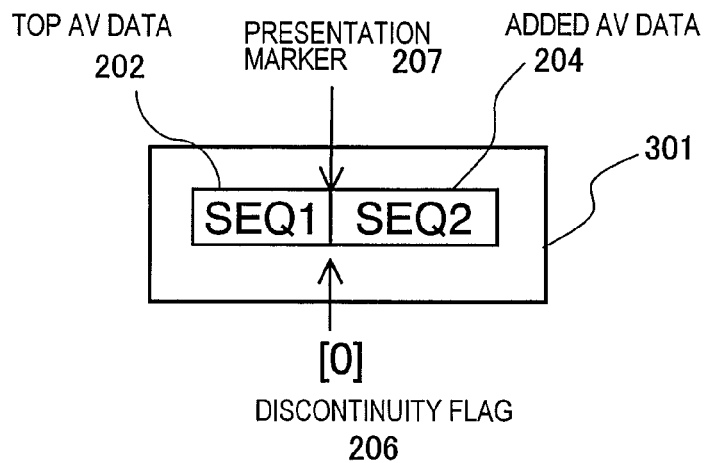
FIG.8
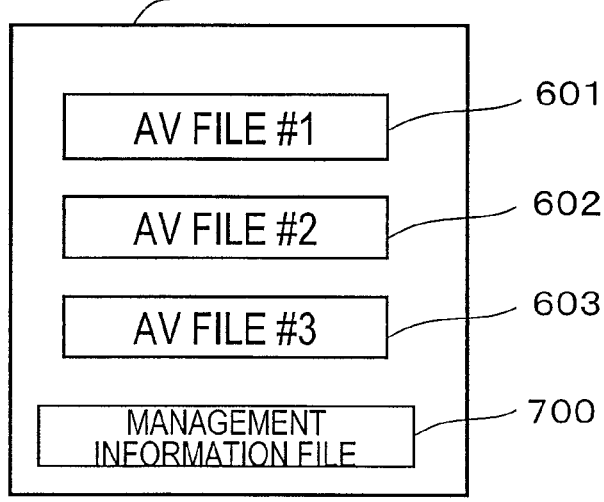

FIG. 9

| AV FILE # | FRAME FREQUENCY | IMAGE SCANNING METHOD | # OF HORIZON- TAL PIXELS | # OF VERTICAL PIXELS | MOVING PICTURE ENCODING METHOD | AUDIO ENCODING METHOD | FILE SIZE | FILE GENERATION DATE |
|---|---|---|---|---|---|---|---|---|
| AV FILE #1 | 60Hz | PROGRESSIVE | 1280 | 720 | MPEG2 | MPEG1 Audio Layer2 | 100MB | SEPT. 1, 2005 |
| AV FILE #2 | 30Hz | INTERLACED | 1920 | 1080 | MPEG4-AVC | Dolby AC-3 | 300MB | SEPT. 5, 2005 |
| AV FILE #3 | 30Hz | INTERLACED | 720 | 480 | MPEG4-AVC | Dolby AC-3 | 500MB | SEPT. 9, 2005 |

700

| FRAME FREQUENCY | IMAGE SCANNING METHOD | # OF HORIZONTAL PIXELS | # OF VERTICAL PIXELS | MOVING PICTURE ENCODING METHOD | AUDIO ENCODING METHOD |
|---|---|---|---|---|---|
| 30Hz | INTERLACED | 1920 | 1080 | MPEG4-AVC | Dolby AC-3 |

⟨EXAMPLE OF INCOMING AV DATA PROPERTIES⟩

RECORDING DEVICE FOR WRITING CONTENT DATA WITHOUT CONTINUITY IN PRESENTATION TIMING

TECHNICAL FIELD

The present invention relates to a technique for writing moving picture, audio or any other content data on a storage medium (which will be simply referred to herein as a "medium"). More particularly, the present invention relates to a technique for writing data that has been captured with a video camera such as a camcorder.

BACKGROUND ART

Recently, various video cameras for writing audiovisual digital data, including video data and audio data (which will be simply referred to herein as "AV data"), on a randomly accessible storage medium such as an optical disk or a flash memory have been proposed.

Since such a video camera has started its recording operation and until it finishes the recording operation (which will be referred to herein as a "recording session") every time, the camera generates a plurality of files. The group of files thus generated is handled as a non-linear set of files on a storage medium.

That is why by repeatedly performing the recording sessions, more and more files will be generated on the storage medium, which is quite a different story from a situation where recording is carried out on a magnetic tape. For that reason, even if the user loads a player with such a storage medium and tries to play his or her desired video, for example, by selecting an appropriate file, it will be difficult for him or her to find his or her target file quickly by searching such a huge number of files. In addition, the player has to perform file opening and closing operations on such a great many files, and therefore, has a heavy processing load to handle.

To get the search done more quickly, Patent Document No. 1 proposes a method for playing back recorded files linearly on a first in first out basis by sorting those files on a storage medium by the timestamps of generation to draw up a playback list and then playing them one after another based on that list.

Patent Document No. 1: Japanese Patent Application Laid-Open Publication No. 2003-217266 (pages 3 to 6 and FIGS. 1 and 9)

DISCLOSURE OF INVENTION

Problems to be Solved by the Invention

According to the method disclosed in Patent Document No. 1, those files can be played back in the order of generation. However, since the playback order is fixed, it is impossible to select and play desired files at random. In addition, the player still has to handle a huge number of files, perform file opening and closing operations numerous times, and still carries as heavy a processing load as conventional players do.

On top of that, due to restrictions imposed by file systems or various standards, the maximum allowable number of files to handle is often defined for a lot of storage media. If recording sessions were frequently carried out at relatively short intervals, then a lot of files of relatively small sizes would be generated. As a result, the maximum allowable number of files should be reached in a relatively short time and the user could not generate files anymore. This means that even if there was still plenty of space left on a storage medium, he or she could not get any more recording sessions done on such a storage medium. This is a serious problem particularly when the same number of management information files are generated as that of AV data files generated or when the number of management information files generated increases in proportion to that of AV data files generated.

An object of the present invention is to provide a data writing technique for randomly accessing any desired data efficiently with the number of files generated decreased.

Means for Solving the Problems

A recorder according to the present invention writes content data on a storage medium. The recorder includes: a determining section, which receives incoming content data and determines data properties thereof; a selecting section for selecting, depending on whether or not a predetermined condition is satisfied, either a first type of write processing to add the data to an existent file on the storage medium or a second type of write processing to write the data as a new file; and a writing section for writing the data on the storage medium by performing the selected type of write processing. The selecting section selects the first type of write processing on the condition that at least one part of the data properties of the data that have been determined by the determining section is identical with those of the data that is stored in the existent file on the storage medium but selects the second type of write processing unless this condition is satisfied.

If the selecting section has selected the first type of write processing, the writing section may start writing the content data at the end of the data in the existent file and may store a piece of management information, indicating the top of the content data, as a management file on the storage medium.

The recorder may further include an additional write processing section for converting the incoming content data into a file format that allows for adding the data to the existent file. The additional write processing section may generate a piece of information, indicating a change point of the data in the existent file, as the management information indicating the top of the content data.

The recorder may further include an additional write processing section for converting the incoming content data into a file format that allows for adding the data to the existent file. The additional write processing section may generate a piece of information, indicating a discontinuity point of presentation time information of the data in the existent file, as the management information indicating the top of the content data.

The recorder may further include an additional write processing section for converting the incoming content data into a file format that allows for adding the data to the existent file. The additional write processing section may generate a piece of information, indicating a playback start point, as the management information indicating the top of the content data. The writing section may store, as a point where the content should start being played back, the piece of information indicating the playback start point in a playback list file in which a list of playable contents is drawn up.

The incoming content data and the data stored in the existent file may include a moving picture. The selecting section may select the first type of write processing on the condition that the frame frequency of the moving picture included in the content is the same as that of the moving picture stored in the existent file.

The incoming content data and the data stored in the existent file may include a moving picture, which is presented by either interlaced scanning or progressive scanning. The selecting section may select the first type of write processing on the condition that the scanning method of the moving picture included in the content is the same as that of the moving picture stored in the existent file.

The incoming content data and the data stored in the existent file may include a moving picture. The selecting section may select the first type of write processing on the condition that the number of vertical pixels to display the moving picture included in the content is the same as that of vertical pixels to display the moving picture stored in the existent file.

The incoming content data and the data stored in the existent file may include a moving picture. The selecting section may select the first type of write processing on the condition that the number of horizontal pixels to display the moving picture included in the content is the same as that of horizontal pixels to display the moving picture stored in the existent file.

The incoming content data and the data stored in the existent file may include encoded moving picture data. The selecting section may select the first type of write processing on the condition that the encoding method of the moving picture data representing the content is the same as that of the moving picture data stored in the existent file.

The incoming content data and the data stored in the existent file may include encoded audio data. The selecting section may select the first type of write processing on the condition that the encoding method of the audio data representing the content is the same as that of the audio data stored in the existent file.

The incoming content data and the data stored in the existent file may include a moving picture, which is presented by either interlaced scanning or progressive scanning. The selecting section may select the first type of write processing on the condition that the frame frequency, the scanning method, the number of vertical pixels, and the number of horizontal pixels of the moving picture included in the content are all the same as those of the moving picture stored in the existent file.

The incoming content data and the data stored in the existent file may include encoded moving picture data. The selecting section may select the first type of write processing on the condition that the encoding method of the moving picture data representing the content is the same as that of the moving picture data stored in the existent file.

The incoming content data and the data stored in the existent file may further include encoded audio data. The selecting section may select the first type of write processing on the condition that the encoding method of the audio data representing the content is the same as that of the audio data stored in the existent file.

Another recorder according to the present invention writes content data on a storage medium. The recorder includes: a determining section, which receives incoming content data and determines data properties thereof; a selecting section for selecting, depending on whether or not a predetermined condition is satisfied, either a first type of write processing to add the data to an existent file on the storage medium or a second type of write processing to write the data as a new file; a writing section for writing the data on the storage medium by performing the selected type of write processing; and an additional write processing section for converting the incoming content data into a file format that allows for adding the data to the existent file. In a situation where the storage medium has a plurality of existent files, the selecting section selects the first type of write processing if any of the existent files satisfies the condition that data stored there have the same data properties as at least one part of the data properties of the data that have been determined by the determining section. The additional write processing section converts the content data into a file format that allows for adding the data to the existent file that satisfies the condition.

Effects of the Invention

A recorder according to the present invention determines, based on a condition that may or may not be satisfied during a write operation, whether the content data to be written should be added to an existent file or newly generated as an independent file. The content data is added to the existent file on the condition that at least some (or even all) of the data properties of the content data are the same as those of the data stored in the existent file on a storage medium. Consequently, multiple sets of AV data with a high degree of continuity or correlation can be combined together into a single file.

In addition, by selecting a type of write processing in which the content data is added to an existent file, the number of files generated on a storage medium can be reduced. As a result, the chances of the number of files generated reaching the maximum allowable number in a short time can be diminished, and therefore, AV data can be written continuously.

BRIEF DESCRIPTION OF DRAWINGS

FIG. 5 shows an exemplary set of AV data properties of the AV file #1 that are described in the management information file 400.

FIG. 6 shows an example 500 of a set of data properties of the AV data newly entered.

FIG. 7 shows the data structure of the existent file 301 to which the incoming AV data has been added.

FIG. 8 shows existent files 601 to 603 (AV files #1 to #3) and their management information file 700 on the storage medium 22 before the write processing is started.

FIG. 9 shows exemplary sets of AV data properties of the AV files #1 to #3 that are described in the management information file 700.

DESCRIPTION OF REFERENCE NUMERALS

Figure 1:
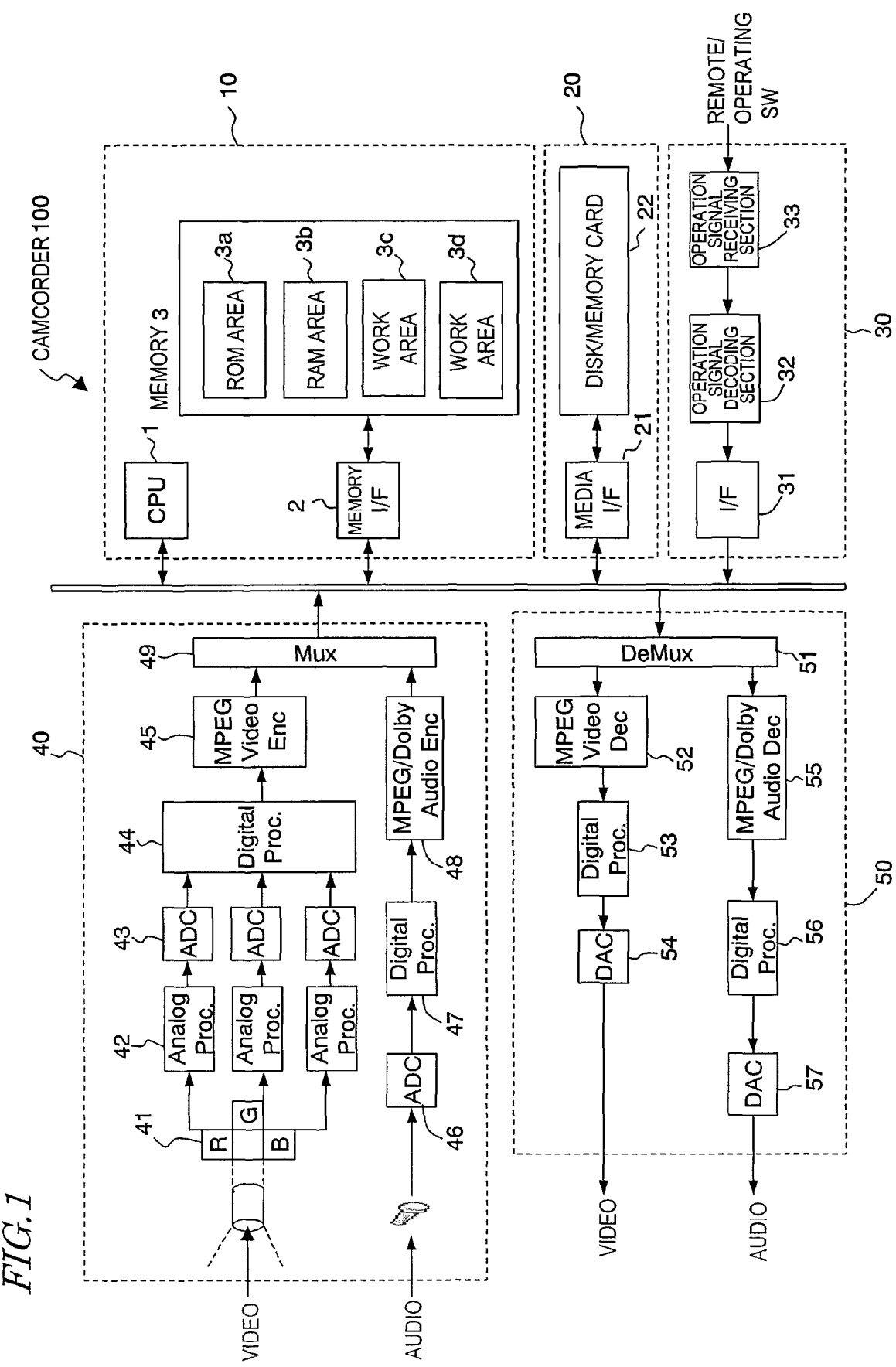
FIG. 1 shows a hardware configuration for a camcorder 100 according to a preferred embodiment of the present invention.

1 CPU
21 media I/F
22 storage medium
101 property determining section
102 file generation processing section
103 file additional write processing section
104 writing method selecting section
105 writing section
107-1, 107-2 switch

BEST MODE FOR CARRYING OUT THE INVENTION

Hereinafter, preferred embodiments of a recorder according to the present invention will be described with reference to the accompanying drawings. In one preferred embodiment of the present invention, the recorder may be implemented as a video recorder for recording video and audio, for example. Therefore, in the following description, a camcorder will be described as a preferred embodiment of a recorder according to the present invention.

FIG. 1 shows a hardware configuration for a camcorder 100 according to a preferred embodiment of the present invention. The camcorder 100 includes a control unit 10, a read/write unit 20, an operating instruction receiving unit 30, an encoding unit 40 and a decoding unit 50, all of which are connected together through a bus.

The control unit 10 controls the overall operation of the camcorder 100 and includes a CPU 1, a memory interface (I/F) 2, and a memory 3. The CPU 1 accesses the memory 3 by way of the memory I/F 2. More specifically, the CPU 1 reads out a computer program that is stored in the ROM area 3a of the memory 3, extends the program on a RAM area 3b, and executes the program. In executing the program, the CPU 1 uses work areas 3c and 3d as needed.

The operation of the control unit 10 will be described more fully later with reference to FIG. 2.

The read/write unit 20 includes a media I/F 21 and a storage medium 22. The media I/F 21 writes the data that has been received from another unit (such as the control unit 10 or the encoding unit 40) via the bus on the storage medium 22. Also, the media I/F 21 reads the data that is stored in the storage medium 22 and transfers the data to another unit (such as the control unit 10 or the decoding unit 50) by way of the bus.

The storage medium 22 has the function of storing data that has been written there. Examples of preferred storage media 22 include magnetic recording media (such as a hard disk), optical storage media (such as a DVD and a Blu-ray disc) and semiconductor storage media (such as a memory card). The storage medium 22 may be either built in and non-removable from the camcorder 100 or removable from the camcorder 100.

The operating instruction receiving unit 30 receives and processes an operation signal that the user has transmitted by tapping on a remote controller or an operating switch. Specifically, the operation signal is received at an operation signal receiving section 33, decoded and analyzed by an operation signal decoding section 32, and then sent as a user's instruction to the control unit 10 by way of an I/F 31. In accordance with the user's instruction, the control unit 10 controls the camcorder 100. The operating instruction receiving unit 30 receives an instruction on the operation of recording a moving picture, e.g., an instruction on when to start or when to stop recording, and passes it to the control unit 10. Also, the operating instruction receiving unit 30 receives an instruction on the properties of AV data to be written, e.g., an instruction on the number of vertical pixels, the number of horizontal pixels, and the method of encoding video, and conveys it to the control unit 10.

The encoding unit 40 performs an encoding process when the camcorder 100 is shooting a moving picture and recording its audio. Specifically, the encoding unit 40 generates video and audio encoded data on two separate processing paths, interleaves these two types of data together, and then outputs them as a data stream.

It will be described how the encoding process is carried out on video. The encoding unit 40 decomposes the incoming video into the three primary colors of light, namely, red (R), green (G) and blue (B), and performs processing on each of these three colors. For example, a group of red detecting photodiodes R41 in a CCD detects the color red and outputs an analog video signal. An analog processor 42 subjects the analog video signal to a predetermined type of processing. An analog-to-digital converter (ADC) 43 converts the analog video signal into a digital video signal. Thereafter, a digital processor 44 receives digital data representing the respective color components and subjects them to a predetermined type of processing, thereby generating a baseband video signal. And an MPEG video encoder 45 carries out MPEG encoding on the baseband video signal to generate an encoded video stream (video elementary stream). It should be noted that various other methods of video encoding processing have been developed recently and it is not always necessary to adopt MPEG encoding.

Meanwhile, audio is processed in the following manner. First, a microphone picks up an analog audio signal. An ADC 46 converts the analog audio signal into a digital audio signal. A digital processor 47 subjects the digital audio signal to a predetermined type of processing, thereby generating a baseband audio signal. And an MPEG audio encoder 48 encodes the baseband audio signal to generate an encoded audio stream (audio elementary stream). It should be noted that various other methods of audio encoding processing have been developed recently and MPEG encoding is not the only option to take.

A multiplexer 49 stores the video and audio elementary streams generated in packets of a fixed length, interleaves various packets together, and then outputs them as an MPEG stream, which is then sent to the control unit 10 and the read/write unit 20.

The decoding unit 50 decodes the MPEG stream that has been read out from the storage medium 22, thereby outputting a moving picture signal and an audio signal. This processing is done in reverse order compared to the processing performed by the encoding unit 40. More specifically, a demultiplexer 51 breaks down the MPEG stream into respective packets, classifies those packets according to their packet types, extracts data from the packets, and then outputs a video elementary stream and an audio elementary stream. A video decoder 52 performs MPEG decoding on the video elementary stream to output a baseband video signal. A digital processor 53 subjects the baseband video signal to a predetermined type of processing. And a digital-to-analog converter 54 converts that signal into an analog video signal, thereby obtaining a video signal representing the moving picture.

Figure 2:
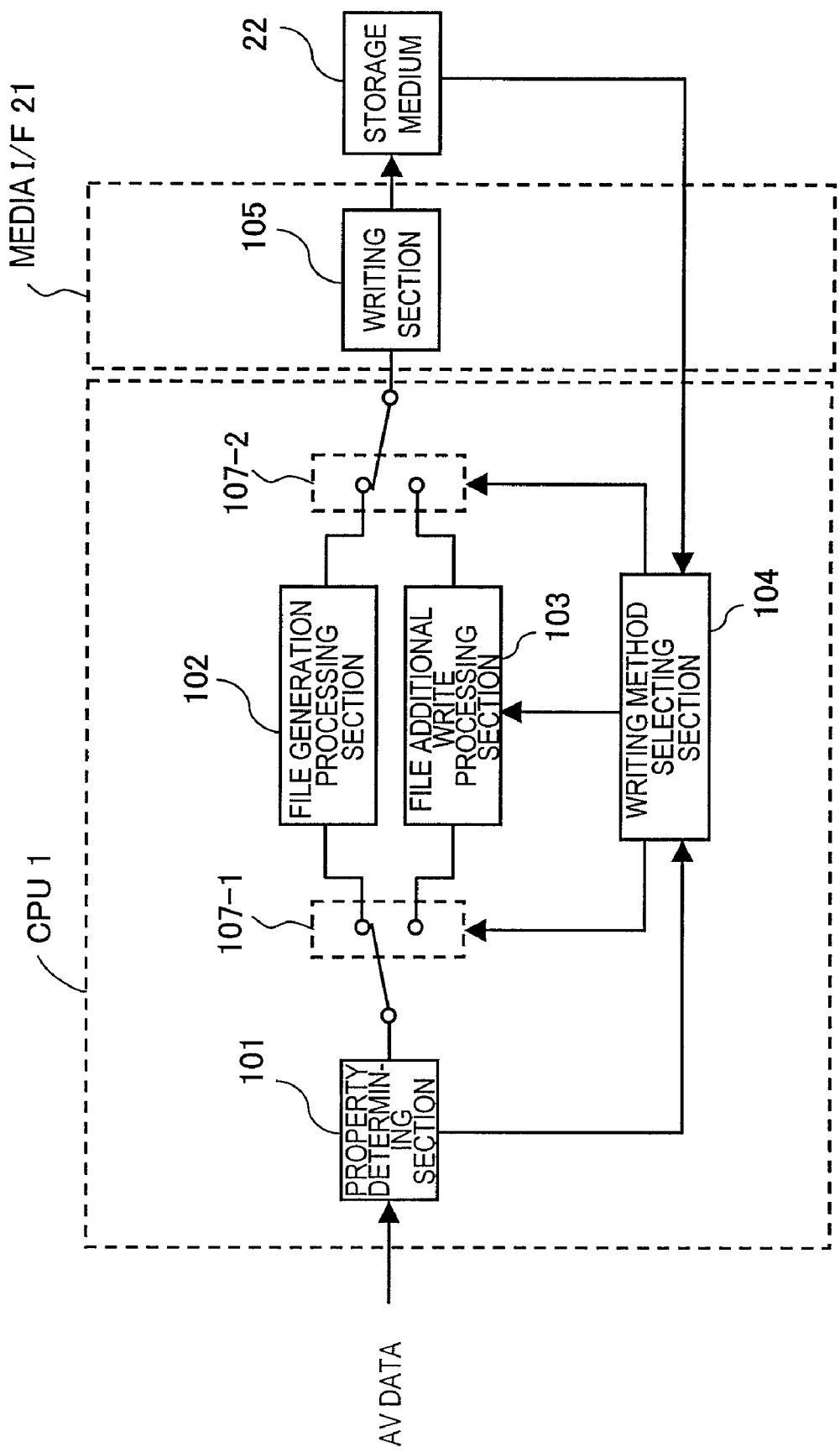
FIG. 2 shows a configuration for a functional block that performs the data writing function of the camcorder 100.

FIG. 2 shows a configuration for a functional block that performs the data writing function of the camcorder 100. This functional block (which will be referred to herein as a "write processing block") is realized by the control unit 10 and the read/write unit 20 shown in FIG. 2.

The write processing block includes a property determining section 101, a file generation processing section 102, a file additional write processing section 103, a writing method selecting section 104, a writing section 105 and the storage medium 22.

The property determining section 101 receives and analyzes AV data such as video data or audio data, thereby determining its data properties. Examples of the "data properties" include the frame frequency of the video, the method of image scanning such as interlaced scanning or progressive scanning, the number of vertical pixels, the number of horizontal pixels, the method of encoding the moving picture, and the method of encoding audio. The property determining section 101 may be implemented as a CPU, for example. The data properties may be determined in the following manner. For example, if the AV data has been generated as an MPEG transport stream and if the PMT (program map table) of the packets that form the transport stream includes information that can be used to determine the data properties, the PMT in the AV data is stored in a work area of the memory 3 and the properties of the AV data are determined by analyzing the PMT that is stored in the work area.

While the property determining section 101 is determining the data properties of the AV data, the AV data is stored in the work area 3c of the memory 3. If the entire AV data were stored in a buffer and analyzed, a huge buffer space or a long processing time might be required. In that case, the property determining section 101 could be implemented as an independent circuit and the data properties could be extracted from the incoming AV data and determined.

Alternatively, the property determining section 101 may receive an encoding-related parameter that has been sent from the MPEG encoder 45, and determine the data properties by that parameter. Still alternatively, if the properties of the AV data to be written are determined following an instruction given by the CPU, the properties of the AV data may be received from the CPU. As another alternative, in accordance with an instruction on the properties of the AV data to be written that has been received from the instruction receiving unit 30, the CPU may specify the video encoding method for the MPEG encoder 45 and the property determining section 101 may receive information about the properties of the AV data to be written from the CPU and determine the properties.

The file generation processing section 102 and the file additional write processing section 103 are located between the property determining section 101 and the writing section 105.

To write and store the AV data to be written as a new file, the file generation processing section 102 generates a file image of the new file.

The file generation processing section 102 is implemented as the CPU 1 that executes a computer program to perform the operation described above. More specifically, the CPU 1 shown in FIG. 1 gets the AV data to be written in the work area 3c of the memory 3 and generates a file image of the AV data in the work area 3d of the memory 3. In this manner, the function of the file generation processing section 102 is realized. It should be noted that the ROM area, the RAM area and the work areas could be arranged physically either in the same memory device or in multiple different memory devices.

On the other hand, the file additional write processing section 103 converts the file format of the AV data to be written such that the AV data to be written can be added to the end of the AV data that is stored in a file on the storage medium 22 with no space left. The data thus converted will be referred to herein as "converted AV data".

The processing of generating the converted AV data includes converting the AV data according to the file system of the storage medium 22. For example, if the storage medium 22 adopts the FAT (file allocation table) file system, the file additional write processing section 103 gets the cluster number of a cluster including the end of data of the file existent on the storage medium 22. At this point in time, the link information of the cluster gotten tells that this is the end of the file. Next, the file additional write processing section 103 gets an empty cluster and instructs the writing section 105 to write the AV data on that cluster. In this case, if a number of clusters are needed to write the AV data on, then the link information of the FAT is updated so that those clusters are continuous with each other. Then, the link information of the cluster just gotten with the end of the file is updated so as to point to the cluster including the top of the AV data that has been newly written. As a result, the converted AV data can be added to the file that is already existent on the storage medium 22.

The file additional write processing section 103 is also implemented as the CPU 1 that executes a computer program to perform the operation described above. More specifically, the CPU 1 gets the AV data to be written in the work area 3c of the memory 3 and recognizes the file format of the existent file on the storage medium 22 to which the data is added. Then, the CPU 1 generates an image of the AV data to be written, having the same file format as that file format, in the work area 3d of the memory 3. In this manner, the function of the file additional write processing section 103 is realized.

In this example, the file generation processing section 102 and the file additional write processing section 103 are supposed to get the AV data to be written in the work area 3c of the memory 3. In this case, either all of the data or only a portion of the data may be stored in the work area 3c. This decision can be made based on the relation between the data size of the AV data and the space left in the work area 3c.

Depending on whether or not a predetermined condition is satisfied during writing, the writing method selecting section 104 selects either the file generation processing section 102 or the file additional write processing section 103. This selection processing based on a condition during writing will be described in detail later. In short, to get the selection processing done, the writing method selecting section 104 turns the switches 107-1 and 107-2 such that either the file generation processing section 102 or the file additional write processing section 103 is connected to the property determining section 101 and the writing section 105.

The writing method selecting section 104 is also implemented as the CPU 1 that executes a computer program to perform the operation described above. In this case, to turn the switches 107-1 and 107-2 corresponds to jumping to a computer program that performs the function of the file generation processing section 102 or that of the file additional write processing section 103 and returning to the original program.

The writing section 105 writes the AV data that has been received from either the file generation processing section 102 or the file additional write processing section 103 on the storage medium 22. The writing section 105 is equivalent to the media I/F 21 shown in FIG. 1.

The writing method selecting section 104 makes its selection either before or after the write operation is started.

Specifically, before the write operation is started, the writing method is selected in accordance with the user's operating instruction. Before starting writing, the writing method selecting section 104 determines in advance, in accordance with the user's instruction, which of these two sections should be activated, the file generation processing section 102 or the file additional write processing section 103. The user's instruction is given to the CPU 1 by way of the operating instruction receiving unit 30.

If the writing method selecting section 104 has selected the file generation processing section 102, the switches 107-1 and 107-2 form a data path that connects the property determining section 101, the file generation processing section 102, and the writing section 105 together. On the other hand, if the writing method selecting section 104 has selected the file additional write processing section 103, the switches 107-1 and 107-2 form a data path that connects the property determining section 101, the file additional write processing section 103, and the writing section 105 together. In the latter case, in accordance with the user's instruction, the writing method selecting section 104 specifies which file on the storage medium 22 the data should be added to, and notifies the file additional write processing section 103 of the file specified.

When recording is started, the AV data that has been acquired by shooting, for example, is input to the property determining section 101 and then transmitted to the writing section 105 by way of either the file generation processing section 102 or the file additional write processing section 103.

When selected and activated, the file generation processing section 102 generates an image of a new file that stores the AV data received. This image is written by the writing section 105 on the storage medium 22. As a result, a new file is generated on the storage medium 22. A file that stores AV data will be referred to herein as an "AV data file". Management information that will be needed in reading the AV data from the AV data file, for example, is generated and stored as a management file, along with the AV data file itself, on the storage medium 22.

On the other hand, when selected and activated, the file additional write processing section 103 generates converted AV data based on the incoming AV data. As used herein, the "converted AV data" is data that has been converted into such a format as to be added to the end of the AV data, which is stored in the existent file that has been selected in advance as a target, with no space left between them. After that, the file additional write processing section 103 generates an image of the converted AV data.

An image of the converted AV data is written by the writing section 105 on the storage medium 22. The converted AV data is added to the end of the AV data in the target existent file continuously. In the meantime, information about the location where the AV data is newly added to the previous AV data (i.e., the top of the new AV data) is stored as a piece of management information in a management file.

It should be noted that a single management file could be used for the entire storage medium 22. For example, the management file corresponds to a VRO file compliant with the DVD standard. Optionally, the management information may be stored in the AV data file, not in the management file.

When a write operation is started, the writing method is determined with various requirements taken into account. Hereinafter, the procedure of that processing will be described with reference to FIG. 3.

Figure 3:
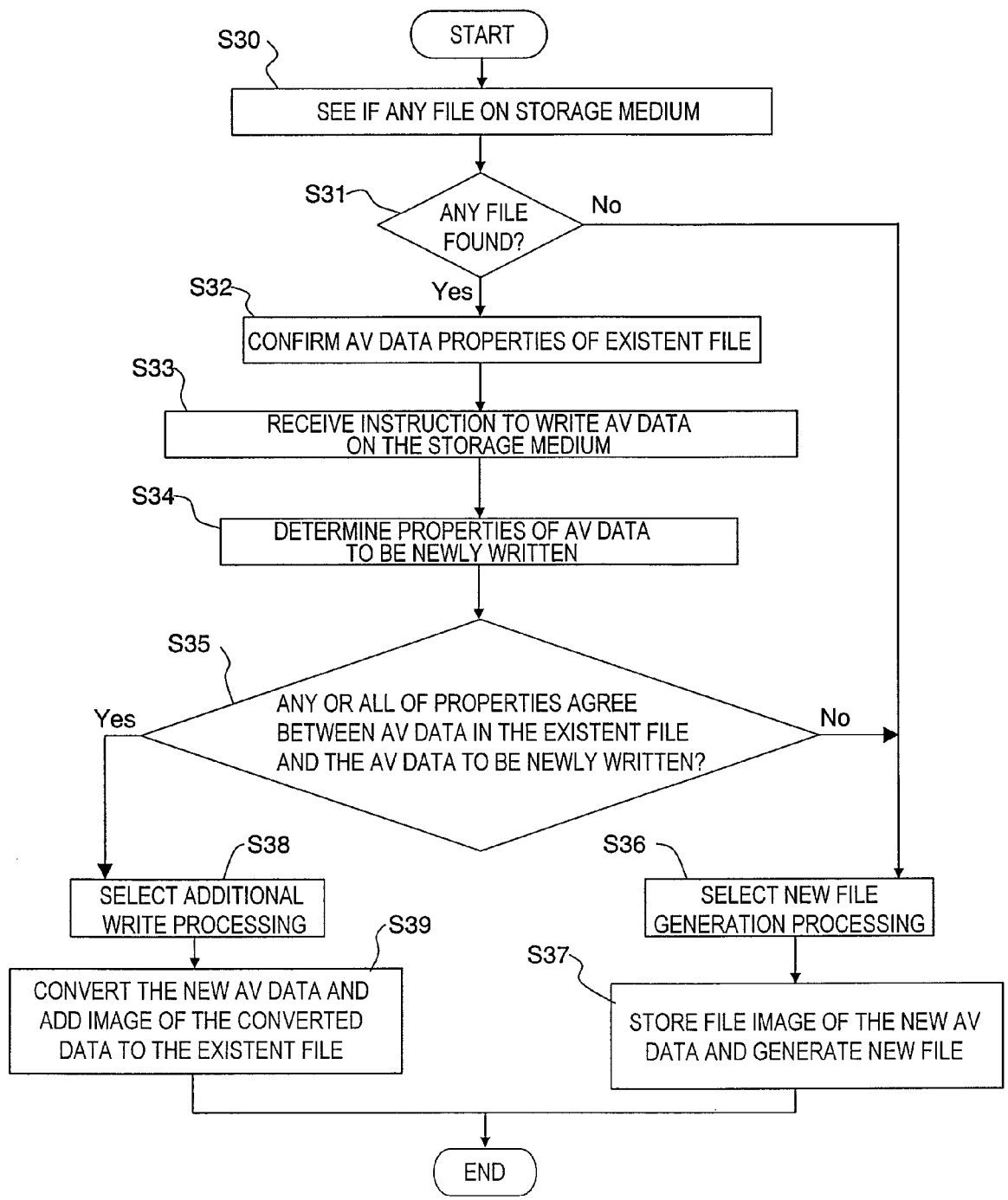
FIG. 3 is a flowchart showing the procedure in which the write processing block (see FIG. 2) selects a writing method automatically and performs a write operation.

FIG. 3 is a flowchart showing the procedure in which the write processing block (see FIG. 2) selects a writing method automatically and performs a write operation.

First, in Step S30, the writing method selecting section 104 sees, by way of the media I/F 21, if there is a file on the storage medium 22. If the answer to the query of Step S31 is YES, the process advances to Step S32. Otherwise, the process advances to Step S36.

It should be noted that the "file" is supposed herein to be a file storing AV data that can be processed (or analyzed) by the camcorder 100. That is why even if there is some type of file but if that file is a text file that stores only text data or a file storing AV data that cannot be analyzed by the camcorder 100, then the writing method selecting section 104 does not confirm the presence of a file.

In the following description, the file present on the storage medium 22 will be referred to herein as an "existent file". There can be one or multiple existent files there. However, only one existent file is supposed to be present for the sake of convenience. An example in which there are a number of existent files will be described later.

In Step S32, the property determining section 101 confirms the properties of the AV data that is stored in the existent file. Information about the properties of the AV data may be stored in the work area 3c of the memory 3, for example.

Next, in Step S33, the writing method selecting section 104 receives an instruction to write the AV data on the storage medium 22 from the user, for example. After this instruction has been received, the encoding unit 40 (see FIG. 1) outputs the AV data to be written.

Subsequently, in Step S34, the property determining section 101 determines the properties of the AV data to be newly written. The decision results are sent to the writing method selecting section 104.

Thereafter, in Step S35, the writing method selecting section 104 determines whether or not any or all of the properties of the AV data stored in the existent file are the same as those of the AV data to be written newly. This is because if one part or all of the properties of the AV data are identical with each other, those multiple sets of data have a high degree of continuity or correlation and it will be meaningful to combine them into a single file. If the answer is YES, the process advances to Step S38. Otherwise, the process advances to Step S36.

In Step S36, the writing method selecting section 104 selects the file generation processing section 102, which receives the AV data to be written and generates a file image of the new file. In the next processing step S37, the file generation processing section 102 outputs the file image to the writing section 105, which stores that file image on the storage medium 22 and generate a new file. When the image of the AV data has all been written, the new file will be complete and the process will end.

On the other hand, in Step S38, the writing method selecting section 104 selects the file additional write processing section 103, which receives the AV data to be written and generates converted data and an image of the converted data. In the next processing step S39, the file generation processing section 102 outputs the image to the writing section 105, which adds that image to the existent file on the storage medium 22. When the image of the converted data has all been written, the new file will be complete and the process will end.

In the foregoing description, the processing step of generating the management information described above is not mentioned in Steps S37 and S39. Actually, however, the management information is generated and the write processing is carried out as already described for writing to be performed before the write operation is started.

In the processing step S35 described above, the writing method selecting section 104 determines whether or not the properties of the two sets of AV data are identical with each other. Hereinafter, specific examples of the properties of the AV data will be described. Optionally, the writing method selecting section 104 can also use other criteria either in addition to, or instead of, determining the properties of the AV data. That is why specific examples of those other criteria will also be given.

(I) Decision to be Made Based on Properties of AV Data

The writing method selecting section 104 manages the information about the properties of the incoming AV data that has been provided by the property determining section 101. Also, the writing method selecting section 104 receives the management information of the existent file on the storage medium 22 from the writing section 105 and manages the information about the properties of the AV data in the existent file, too.

Following are examples of the AV data properties to manage:

(I-1) Frame Frequency of Moving Picture

Properties of two sets of AV data that should be compared to each other to determine whether or not they are identical with each other may be the frame frequency of a moving picture included in the AV data. As used herein, the frame frequency of a moving picture means the number of frames of the moving picture to be presented per unit time. That is to say, if their frame frequencies are equal to each other, the incoming AV data may be added to the existent file. Otherwise, an independent file may be generated based on the incoming AV data.

(I-2) Image Scanning Method of Moving Picture

Properties of two sets of AV data that should be compared to each other to determine whether or not they are identical with each other may be the image scanning method of the moving picture included in the AV data. The image scanning method of the moving picture refers to a method of displaying an image that should be scanned by either interlaced scanning or progressive scanning. That is to say, if their image scanning methods of the moving picture data are the same, the incoming AV data may be added to the existent file. Otherwise, an independent file may be generated based on the incoming AV data.

(I-3) Number of Vertical Pixels of Moving Picture Data

Properties of two sets of AV data that should be compared to each other to determine whether or not they are identical with each other may be the number of vertical pixels of the moving picture data included in the AV data. That is to say, if their numbers of vertical pixels of the moving picture data are the same, the incoming AV data may be added to the existent file. Otherwise, an independent file may be generated based on the incoming AV data.

(I-4) Number of Horizontal Pixels of Moving Picture Data

Properties of two sets of AV data that should be compared to each other to determine whether or not they are identical with each other may be the number of horizontal pixels of the moving picture data included in the AV data. That is to say, if their numbers of horizontal pixels of the moving picture data are the same, the incoming AV data may be added to the existent file. Otherwise, an independent file may be generated based on the incoming AV data.

(I-5) Encoding Method of Moving Picture Data

Properties of two sets of AV data that should be compared to each other to determine whether or not they are identical with each other may be the encoding method of the moving picture data included in the AV data. That is to say, if their encoding methods of the moving picture data are the same, the incoming AV data may be added to the existent file. Otherwise, an independent file may be generated based on the incoming AV data.

(I-6) Encoding Method of Audio Data

Properties of two sets of AV data that should be compared to each other to determine whether or not they are identical with each other may be the encoding method of the audio data included in the AV data. That is to say, if their encoding methods of the audio data are the same, the incoming AV data may be added to the existent file. Otherwise, an independent file may be generated based on the incoming AV data.

Two or more of these properties (I-1) through (I-6) of the AV data may be combined and compared with each other.

An example of such a combination will be described. If the frame frequencies, image scanning methods, numbers of horizontal pixels, numbers of vertical pixels, moving picture encoding methods and audio encoding methods of the two sets of AV data are all identical with each other, the incoming AV data may be added to the existent file. Otherwise, an independent file may be generated based on the incoming AV data.

In another exemplary combination, if the frame frequencies, image scanning methods, numbers of horizontal pixels, and numbers of vertical pixels of the two sets of AV data are the same with each other, the incoming AV data may be added to the existent file. Otherwise, an independent file may be generated based on the incoming AV data.

As described above, by determining whether or not any or all of the properties are identical with each other, multiple sets of data with a higher degree of correlation can be combined into a single file.

For example, in a situation where any or all of the properties of the AV data retrieved from a given file are identical with those of the AV data in an existent file, when decoded video should be obtained by entering the given file into a video decoder during playback, that video decoder has only to be compatible with the encoding method that was adopted to encode the video of that file. For the same reason, when decoded audio should be obtained by entering the given file into an audio decoder, that audio decoder has only to be compatible with the encoding method that was adopted to encode the video of that file. The video decoder and the video decoder do not have to be compatible with various encoding methods to decode a given file. That is why the function can be simplified and the manufacturing cost can be cut down at the same time, which is very beneficial. It should be noted that even when the decoding process should get done by executing a computer program (in other words, even when the decoding process should get done by software decoding), the function of the program could also be simplified and the cost of making the program could also be cut down.

Another effect will be described. Specifically, since the properties of the decoded video are identical with each other, the video display device to display that video thereon just needs to accept at least that video property. That is to say, in displaying the video of a single file, the video display device does not have to be compatible with various display methods, which is beneficial, too.

Next, specific examples of other criteria that could be used to make the decision besides the properties of AV data will be described.

(II) Decision to be Made Based on File Write Time

The writing method selecting section 104 manages information about the date and time when the operation of writing the incoming AV data was started (which will be referred to herein as "write time information"). Also, the writing method selecting section 104 receives either the management information of the existent file on the storage medium 22 from the writing section 105 or the write time information of the existent file managed by a file system and manages the write time information of the existent file, too.

Specifically, the writing method selecting section 104 compares the write time information of the incoming AV data to that of the file on the storage medium 22. If these two pieces of information carry the same date, the writing method selecting section 104 designates that file as a target file to which the data should be added, and then selects and activates the file additional write processing section 103 to add the incoming AV data to that target file. This is because if the dates are the same, these two sets of AV data have a high degree of continuity or correlation and it is meaningful to combine those sets of data into a single file.

On the other hand, if those pieces of information have mutually different dates, then the writing method selecting section 104 selects and activates the file generation processing section 102 to newly generate a file.

(III) Decision to be Made Based on Who Made the File

To adopt this criterion in making a decision, after the camcorder 100 has been turned ON or when a video recording operation is started, the current user needs to enter data to identify himself or herself (which will be referred to herein as "ID data") with a remote controller or an operating switch (not shown) and the writing method selecting section 104 needs to manage that piece of information. In addition, the ID data also needs to be stored as attribute data of the AV data in either an AV data file or a management information file.

The writing method selecting section 104 receives the ID data from the operating instruction receiving unit 30, manages it, and compares the ID data to that stored in the file on the storage medium 22. If these two pieces of information are identical with each other, then the writing method selecting section 104 identifies the current user as the person who made the existent file and designates that file as a target file to which the incoming AV data should be added. Then, the writing method selecting section 104 selects and activates the file additional write processing section 103 to add the incoming AV data to that target file. If the same person is engaged in writing, then the degree of continuity or correlation of the multiple sets of AV data should be higher than a situation where two different persons are involved in writing. That is why it is meaningful to combine those two sets of AV data into a single file.

On the other hand, if they are different persons, then the writing method selecting section 104 selects and activates the file generation processing section 102 to newly generate a file.

(IV) Decision to be Made Based on File Size

The writing method selecting section 104 monitors the file sizes of existent files on the storage medium 22. And when AV data is newly written, the writing method selecting section 104 designates one of the existent files, of which the file size is smaller than a predetermined threshold value, as the target file to add the AV data to. Then, the writing method selecting section 104 selects and activates the file additional write processing section 103 to add the incoming AV data to that target file. If the AV data entered has a small size, then more AV data is likely to be entered soon. That is why it is meaningful to determine the target file by the file size.

On the other hand, if the sizes of all existent files are equal to or greater than the predetermined threshold value, then the writing method selecting section 104 selects and activates the file generation processing section 102 to newly generate a file.

(V) Decision to be Made Based on Recording Duration

The writing method selecting section 104 monitors the recording durations of the AV data stored on the storage medium 22. And when AV data is newly written, the writing method selecting section 104 designates one of the existent files, of which the recording duration is smaller than a predetermined threshold value, as the target file to add the AV data to. Then, the writing method selecting section 104 selects and activates the file additional write processing section 103 to add the incoming AV data to that target file. If the AV data entered has a short recording duration, then more AV data is likely to be entered soon. That is why it is meaningful to determine the target file by the file size.

On the other hand, if the durations of the AV data stored in all existent files are equal to or greater than the predetermined threshold value, then the writing method selecting section 104 selects and activates the file generation processing section 102 to newly generate a file.

(VI) Decision to be Made Based on Number of Files

The writing method selecting section 104 monitors the number of files on the storage medium 22. The "number of files" may be the number of existent AV data files. And if the number of files is greater than a predetermined threshold value when AV data is newly written, the writing method selecting section 104 designates one of those existent files (e.g., the existent file that was written last) as the target file to add the incoming AV data to. Then, the writing method selecting section 104 selects and activates the file additional write processing section 103 to add the incoming AV data to that target file. The predetermined threshold value may be determined with respect to the maximum allowable number of files that is defined by a file system, for example. That is to say, if the number of files reached the maximum allowable number of files, no AV data could be written anymore. That is why by setting the threshold value to be smaller than the maximum allowable number of files, it is possible to avoid the unwanted situation where the maximum allowable number of files is reached and thereby allow the user to continue to write AV data.

On the other hand, if the number of files is less than the predetermined threshold value, then the writing method selecting section 104 selects and activates the file generation processing section 102 to newly generate a file.

It should be noted that these criteria (I) through (VI) to make a decision could be combined arbitrarily. Furthermore, in a situation where the file additional write processing section 103 has been selected to add the incoming AV data, if the storage medium 22 has multiple existent files that can be target files to add that AV data to, then the properties of the incoming AV data may be compared to those of the AV data stored in those files on the storage medium 22. Then, one of those files that stores AV data, a part or all of the properties of which are identical with those of the incoming AV data, may be designated as the target file.

In this preferred embodiment, specific properties of the AV data could be an arbitrary combination of the AV data properties (I) through (VI). Then, multiple sets of AV data with an even higher degree of continuity or correlation can be combined into a single file. The combination of those criteria may be determined arbitrarily either by the user or by the manufacturer before the camcorder 100 is shipped.

In the preferred embodiment described above, a recorder according to the present invention is supposed to be a camcorder. However, the present invention is in no way limited to that specific preferred embodiment as a camcorder. Instead, the present invention is effectively applicable to any device that can write AV data on a randomly accessible storage medium.

Hereinafter, a specific example of the processing to be carried out following the procedure shown in FIG. 3 will be described.

Suppose there is an AV data file on the storage medium 22 and AV data of a moving picture is newly entered into the write processing block (see FIG. 2).

Figure 4:
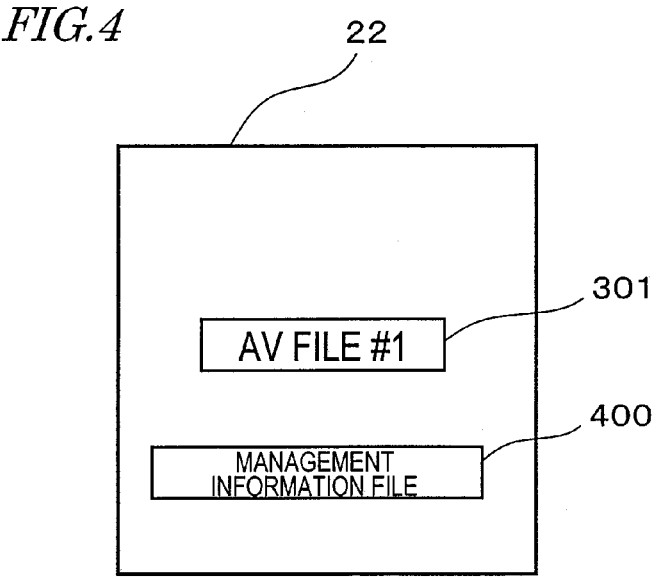
FIG. 4 shows an existent file 301 (AV file #1) and its management information file 400 on the storage medium 22 before write processing is started.

FIG. 4 shows an existent file 301 (AV file #1) and its management information file 400 on the storage medium 22 before write processing is started. FIG. 5 shows an exemplary set of AV data properties of the AV file #1 that are described in the management information file 400. This AV data have properties that are characterized by having a frame frequency of 30 Hz, adopting interlaced scanning as the image scanning method, having 1,920 horizontal pixels and 1,080 vertical pixels, adopting MPEG (Moving Picture Image Coding Experts Group) 4-AVC (Advanced Video Coding) as the moving picture encoding method, adopting Dolby AC-3 (Audio Code #3) as the audio encoding method, having a file size of 300 MB (megabytes) and having a file generation date of Sep. 5, 2005.

FIG. 6 shows an example 500 of a set of data properties of the AV data newly entered. The incoming AV data is a moving picture, which is characterized by having a frame frequency of 30 Hz, adopting interlaced scanning as the image scanning method, having 720 horizontal pixels and 480 vertical pixels, adopting MPEG4-AVC as the moving picture encoding method and adopting Dolby AC-3 as the audio encoding method.

In this preferred embodiment, the criteria adopted by the writing method selecting section 104 to make a decision in Step S35 (see FIG. 3) are set as follows. Specifically, if properties of the incoming AV data are identical with those of the AV data in the existent file in terms of the frame frequency, image scanning method, moving picture encoding method and audio encoding method, the incoming AV data is added to the existent file in Step S38. Otherwise, a new file is generated in Step S36.

As shown in FIGS. 5 and 6, under these criteria, the writing method selecting section 104 selects the process of adding the incoming AV data to the existent file. FIG. 7 shows the data structure of the existent file 301 to which the incoming AV data has been added. In the existent file 301, there are AV data 202 that has already been present as identified by SEQ1 and another AV data 204 that has just been added as identified by SEQ2. Also, a discontinuity flag 206, indicating that these two sets of AV data are discontinuous on the time axis, is added to the seam between the two sets of AV data. The values given to the flags sequentially increase from zero. Also given to the seam between the two sets of AV data is a presentation marker 207 that indicates the playback start point.

According to an MPEG standard, if two sets of data are discontinuous, it means that pieces of time management information that has been given to the two sets of moving picture data SEQ1 and SEQ2 (more specifically, system clock references (SCRs), presentation time stamps (PTSs) and decoding time stamps (DTSs)) are not continuous with each other. That is why there is no continuity in presentation timing. For each of SEQ1 and SEQ2, SCR, PTS and DTS according to the MPEG standard are given continuously following a predetermined rule.

The discontinuity flag 206 and the presentation marker 207 may be inserted between the two sets of AV data 202 and 204 or may added to the management information 400. In the latter case, the flag and marker may be located by the number of bits as counted from the top of the file 301.

In the management information file 400 shown in FIG. 4, described are writing start point information of the top AV data 202 and that of another AV data 204 as counted from the writing start point of that top AV data 202.

By adopting such a data structure, it can be seen that the AV data that seems to form one set of data in a single file actually consists of multiple sets of AV data that were written at mutually different times. This means that when AV data needs to be randomly selected and presented one set after another, such selections can be made more efficiently.

If the criteria of the decision to be made by the writing method selecting section 104 in Step S35 (see FIG. 3) were changed, then the processing steps to perform would also change. Suppose the process advances to the processing step S38 of adding the incoming data to the existent file only if not only the frame frequencies, image scanning methods, moving picture encoding methods and audio encoding methods but also the numbers of horizontal pixels and the numbers of vertical pixels are all identical with each other. On the other hand, if not all of these properties is identical with each other, then the process advances to the processing step S36 of generating a new file. In that case, when the exemplary sets of AV data properties shown in FIGS. 5 and 6 are adopted, the newly incoming AV data is stored separately as an independent file.

Next, an example in which there are a number of AV data files on the storage medium 22 when new AV data starts to be written there will be described.

FIG. 8 shows existent files 601 to 603 (which will be referred to herein as "AV files #1 to #3", respectively) and their management information file 700 on the storage medium 22 before the write processing is started. A single management information file 700 is provided for multiple existent files 601 to 603.

FIG. 9 shows exemplary sets of AV data properties of the AV files #1 to #3 that are described in the management information file 700. Specifically, these AV files #1 to #3 have properties that are characterized by having frame frequencies of 60 Hz, 30 Hz and 30 Hz, adopting progressive scanning, interlaced scanning and interlaced scanning as their image scanning methods, having 1,280, 1,920 and 720 horizontal pixels and 720, 1,080 and 480 vertical pixels, adopting MPEG2, MPEG4-AVC and MPEG4-AVC as their moving picture encoding methods, adopting MPEG1 Audio Layer2, Dolby AC-3 and Dolby AC-3 as their audio encoding methods, having file sizes of 100 MB, 300 MB and 500 MB and having file generation dates of Sep. 1, 2005, Sep. 5, 2005 and Sep. 9, 2005, respectively.

Figures 10, 11:
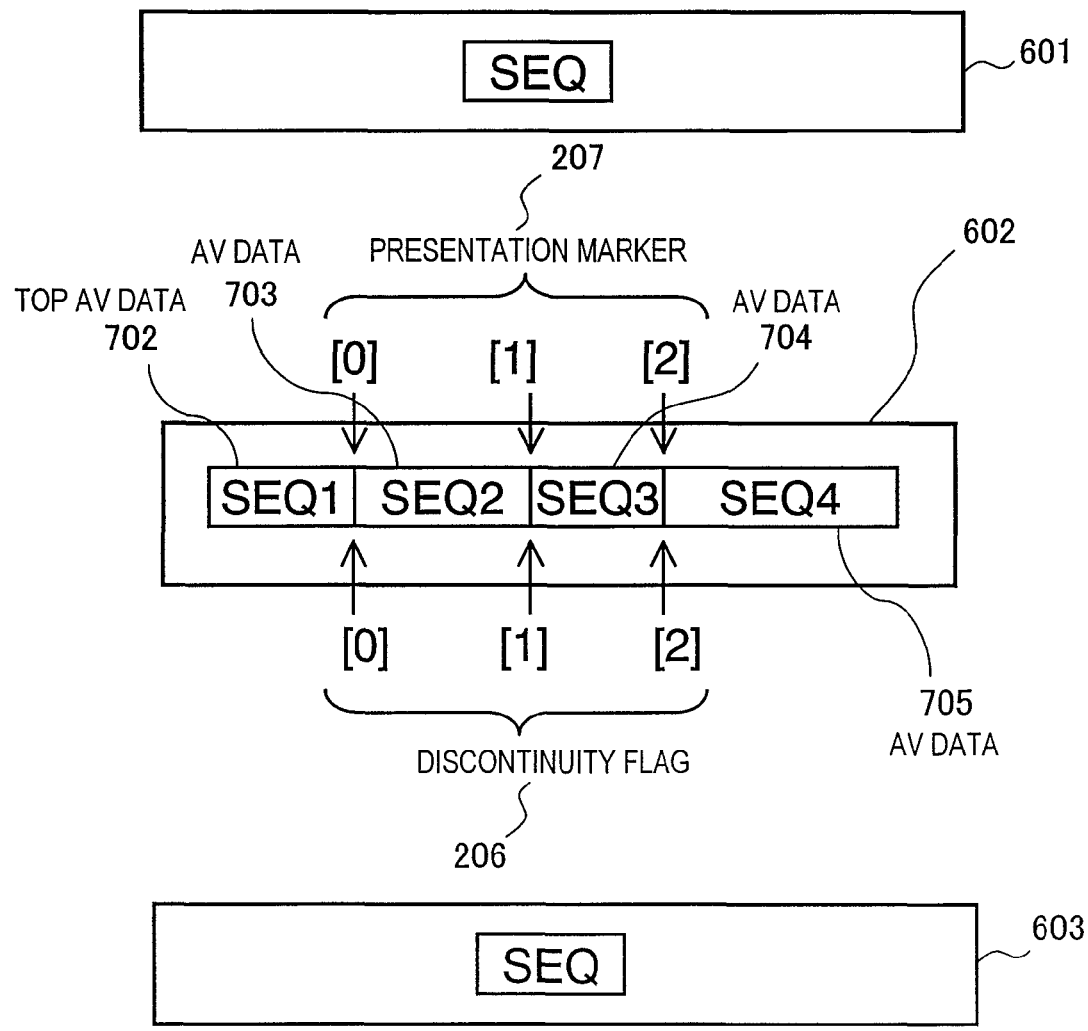
FIG. 10 shows an example 800 of a set of data properties of the AV data newly entered.
FIG. 11 shows an exemplary data structure of the existent file 602 that has been subjected to the additional write processing a number of times.

FIG. 10 shows an example 800 of a set of data properties of the AV data newly entered. The incoming AV data is a moving picture, which is characterized by having a frame frequency of 30 Hz, adopting interlaced scanning as its image scanning method, having 1,920 horizontal pixels and 1,080 vertical pixels, adopting MPEG4-AVC as its moving picture encoding method, and adopting Dolby AC-3 as its audio encoding method.

In this preferred embodiment, the criteria adopted by the writing method selecting section 104 to make a decision in Step S35 (see FIG. 3) are set as follows. Specifically, if there is any AV file, of which the properties include the same frame frequency, same image scanning method, same number of vertical pixels, same number of horizontal pixels, same moving picture encoding method and same audio encoding method as those of the incoming AV data and which has a file size of 400 MB or less, as an existent file on the storage medium 22, then the incoming AV data is added to that AV file. Otherwise, the incoming AV data is stored separately as an independent file.

Under these conditions, AV file #2 (i.e., existent file 602) is the only target file to which the incoming AV data should be added. Thus, the writing method selecting section 104 selects the process of adding the incoming AV data to the AV file 602 that is already existent on the storage medium 22. As a result, the AV data is added to the existent file 602.

FIG. 11 shows an exemplary data structure of the existent file 602 that has been subjected to the additional write processing a number of times. Existent files 601 and 603 that have never been subjected to the additional write processing are also shown in FIG. 11.

The existent file 602 includes multiple sets of AV data 702, 703, 704 and 705, which are identified by SEQ1 through SEQ4, respectively, and which were generated at mutually different dates and times. In the management information file 700 (FIG. 8), described are write time information indicating the writing start point of the top AV data 702 and write time information of the other sets of AV data 703, 704 and 705, which is counted from the writing start point of that top AV data 702.

In addition, not only the discontinuity flag 206 described above but also the presentation marker 207 representing the playback start point are provided for the seam between each adjacent pair of AV data sets. If a playback list file that stores a list of available contents is provided, then the presentation marker 207 may be used as a piece of information indicating the playback start point. As a result, the location where the presentation marker 207 has been put may be managed as the playback start point of a content.

By adopting such a data structure, particularly when AV data needs to be randomly selected and presented one set after another, such selections can be made more efficiently.

If a number of AV files on the storage medium 22 have turned out to be qualified as a file to add the incoming AV data to as a result of the target file search, then further requirements may be set. For example, the AV data may be selectively added to one of those files that has the latest file generation date.

In the example shown in FIGS. 9 and 10, if only the requirement that the file size should be 400 MB or less is changed into a one that the file size should be 200 MB or less, no AV files on the storage medium 22 satisfy these requirements. In that case, in the exemplary AV data properties shown in FIGS. 9 and 10, the newly incoming AV data is stored separately as an independent file.

If write operations are performed repeatedly by such a writing method from the beginning through the end, the increase in the number of files generated can be checked. That is to say, the chances of the number of files generated on a storage medium reaching the maximum allowable number in a short time can be diminished.

Next, it will be described exactly what type of processing is carried out during playback. Suppose the additional write processing has been done on a file with the same date. In that case, to select his or her desired AV data, first, the user picks a file with the given date, and then selects the target AV data by reference to the presentation marker 206 in the file picked. As a result, any single set of AV data can be selected and played at random one after another, thus achieving better processing efficiency.

That is to say, by storing multiple sets of AV data in a single file through the additional write processing, the AV data of multiple contents can be accessed by opening that single file. Compared to a situation where a single set of AV data is stored in a single file, the complexity of the processing to get done to open or close a single file can be reduced. As a result, particularly when a list of contents needs to be presented or when multiple contents needs to be played back continuously, the processing can get done very quickly and the processing load can be lightened.

When AV data is added to an existent file, information representing the playback start point is generated, as a piece of management information indicating the top of the content data added, by reference to the presentation marker 207 and the discontinuity flag 206 and a playback list file, storing a list of available contents, is generated. In the playback list file, the information representing the playback start point as the point where the content should start to be played back is stored in association with the content name, for example. If a list of available contents is presented to the user by reference to this playback list file, the complexity of the processing to get done to open or close a file can be further reduced, and yet multiple contents can be accessed at random.

INDUSTRIAL APPLICABILITY

A recorder and a writing method according to the present invention can not only reduce the number of files generated to prevent that number from reaching the maximum allowable number in a short time but also combine multiple sets of AV data with a high degree of continuity or correlation into a single file. Since the file needs to be processed a decreased number of times, the processing load can be lightened and the processing can get done more quickly. As a result, any desired AV data can be efficiently selected at random from the storage medium.

The invention claimed is:

1. A recorder for writing content data on a storage medium, the recorder comprising:
    a selecting section for selecting, depending on whether or not a predetermined condition is satisfied, either a first type of write processing to add incoming content data to an existent file on the storage medium or a second type of write processing to write the incoming content data as a new file; and
    a writing section for writing the incoming content data on the storage medium by performing the selected type of write processing,
    wherein the existent file stores a data,
    the data that is stored in the existent file and the incoming content data have no continuity in presentation timing, and
    the selecting section selects the first type of write processing on the condition that at least one part of the data properties of the incoming content data is identical with those of the data that is stored in the existent file on the storage medium but selects the second type of write processing unless this condition is satisfied.

2. The recorder of claim 1, wherein if the selecting section has selected the first type of write processing, the writing section starts writing the incoming content data at the end of the data in the existent file and stores a piece of management information, indicating the top of the incoming content data, as a management file on the storage medium.

3. The recorder of claim 2, further comprising an additional write processing section for converting the incoming content data into a file format that allows for adding the data to the existent file,
    wherein the additional write processing section generates a piece of information, indicating a change point of the data in the existent file, as the management information indicating the top of the incoming content data.

4. The recorder of claim 2, further comprising an additional write processing section for converting the incoming content data into a file format that allows for adding the data to the existent file,
    wherein the additional write processing section generates a piece of information, indicating a discontinuity point of presentation time information of the data in the existent file, as the management information indicating the top of the incoming content data.

5. The recorder of claim 2, further comprising an additional write processing section for converting the incoming content data into a file format that allows for adding the data to the existent file,
    wherein the additional write processing section generates a piece of information, indicating a playback start point, as the management information indicating the top of the incoming content data, and
    wherein the writing section stores, as a point where the content should start being played back, the piece of information indicating the playback start point in a playback list file in which a list of playable contents is drawn up.

6. The recorder of claim 1, wherein the incoming content data and the data stored in the existent file include a moving picture, and
    wherein the selecting section selects the first type of write processing on the condition that the frame frequency of the moving picture included in the content is the same as that of the moving picture stored in the existent file.

7. The recorder of claim 1, wherein the incoming content data and the data stored in the existent file include a moving picture, which is presented by either interlaced scanning or progressive scanning, and
wherein the selecting section selects the first type of write processing on the condition that the scanning method of the moving picture included in the content is the same as that of the moving picture stored in the existent file.

8. The recorder of claim 1, wherein the incoming content data and the data stored in the existent file include a moving picture, and
wherein the selecting section selects the first type of write processing on the condition that the number of vertical pixels to display the moving picture included in the content is the same as that of vertical pixels to display the moving picture stored in the existent file.

9. The recorder of claim 1, wherein the incoming content data and the data stored in the existent file include a moving picture, and
wherein the selecting section selects the first type of write processing on the condition that the number of horizontal pixels to display the moving picture included in the content is the same as that of horizontal pixels to display the moving picture stored in the existent file.

10. The recorder of claim 1, wherein the incoming content data and the data stored in the existent file include encoded moving picture data, and
wherein the selecting section selects the first type of write processing on the condition that the encoding method of the moving picture data representing the content is the same as that of the moving picture data stored in the existent file.

11. The recorder of claim 1, wherein the incoming content data and the data stored in the existent file include encoded audio data, and
wherein the selecting section selects the first type of write processing on the condition that the encoding method of the audio data representing the content is the same as that of the audio data stored in the existent file.

12. The recorder of claim 1, wherein the incoming content data and the data stored in the existent file include a moving picture, which is presented by either interlaced scanning or progressive scanning, and
wherein the selecting section selects the first type of write processing on the condition that the frame frequency, the scanning method, the number of vertical pixels, and the number of horizontal pixels of the moving picture included in the content are all the same as those of the moving picture stored in the existent file.

13. The recorder of claim 12, wherein the incoming content data and the data stored in the existent file include encoded moving picture data, and
wherein the selecting section selects the first type of write processing on the condition that the encoding method of the moving picture data representing the content is the same as that of the moving picture data stored in the existent file.

14. The recorder of claim 13, wherein the incoming content data and the data stored in the existent file further include encoded audio data, and
wherein the selecting section selects the first type of write processing on the condition that the encoding method of the audio data representing the content is the same as that of the audio data stored in the existent file.

15. A recorder for writing content data on a storage medium, the recorder comprising:
a determining section, which receives incoming content data and determines data properties thereof;
a selecting section for selecting, depending on whether or not a predetermined condition is satisfied, either a first type of write processing to add the data to an existent file on the storage medium or a second type of write processing to write the data as a new file;
a writing section for writing the data on the storage medium by performing the selected type of write processing; and
an additional write processing section for converting the incoming content data into a file format that allows for adding the data to the existent file,
wherein in a situation where the storage medium has a plurality of existent files, the selecting section selects the first type of write processing if any of the existent files satisfies the condition that data stored on a storage medium have the same data properties as at least one part of the data properties of the data that have been determined by the determining section, and
wherein the additional write processing section converts the content data into a file format that allows for adding the data to the existent file that satisfies the condition.

* * * * *